May 2, 1944.  J. LEDWINKA  2,348,077
BRAKE MECHANISM
Filed Nov. 14, 1941  2 Sheets-Sheet 1

INVENTOR
Joseph Ledwinka
BY John P. Tarbox
ATTORNEY

May 2, 1944. J. LEDWINKA 2,348,077
BRAKE MECHANISM
Filed Nov. 14, 1941 2 Sheets-Sheet 2

INVENTOR
Joseph Ledwinka
BY John P. Barby
ATTORNEY

Patented May 2, 1944

2,348,077

UNITED STATES PATENT OFFICE 2,348,077

BRAKE MECHANISM

Joseph Ledwinka, Philadelphia, Pa., assignor to Budd Wheel Company, Philadelphia, Pa., a corporation of Pennsylvania Application November 14, 1941, Serial No. 419,116

10 Claims. (Cl. 188—59)

The invention relates to brake mechanisms and, more particularly, to such mechanisms adapted to be associated with trucks having tandem wheels arranged between longitudinal girders forming the main members of the truck frame.

It is an object of the invention to provide a simple, and inexpensive such brake mechanism, in which the brake parts are in large part protected against dirt and snow, and one which is readily assembled and disassembled with the truck frame.

It is a further object of the invention to provide a readily assembled arrangement of rotary brake parts with the wheel and one which allows for the free expansion and contraction of the rotary brake parts without stressing the wheel with which they are associated.

These objects are in large part attained by mounting the rotary brake parts on opposite sides of the wheel body in such manner that they are free to expand and contract radially under varying conditions of temperature and by providing a driving connection between the wheel and rotary brake parts which permits such expansion and contraction while maintaining at all times a firm driving connection. They are further attained by mounting a large part of the brake mechanism, such as the brake shoes for cooperating with the rotary brake parts on the wheel on a transverse member of the truck frame interconnecting the spaced girders, and to provide for the ready assembly and disassembly of this transverse member and the associated brake parts mounted thereon, with the truck, means are provided for readily attaching and detaching the transverse member from the girders which it connects. The brake cylinder for actuating the levers is preferably fixedly carried by the truck frame and the ends of the brake levers are arranged to be readily inserted and withdrawn from their cooperative relation to the pistons in the cylinder, in the assembly and disassembly of the transverse supporting member and parts mounted thereon. Emergency operating means may also be mounted on the transverse supporting member and connected to the brake levers carried thereby to operate the brake shoes carried by the levers independently of the cylinder.

Finally, the space between a transverse member of the frame mounting the cylinder and the transverse brake support, both of which are substantially the depth of the side girders of the frame, form with the side girders a box housing most of the brake mechanism, which may be sealed, as by closing plates at top and bottom and by sealing means about the openings in the transverse brake support through which the brake levers extend, thereby providing a closed housing for the major part of the brake mechanism to exclude dirt and snow therefrom.

Other and further objects and advantages and the means by which they are attained will become clear from the following detailed description when read in connection with the drawings forming a part hereof.

In the drawings,

Fig. 4 is a fragmentary detail sectional view taken substantially on the line 4—4 of Fig. 2.

Figure 1:
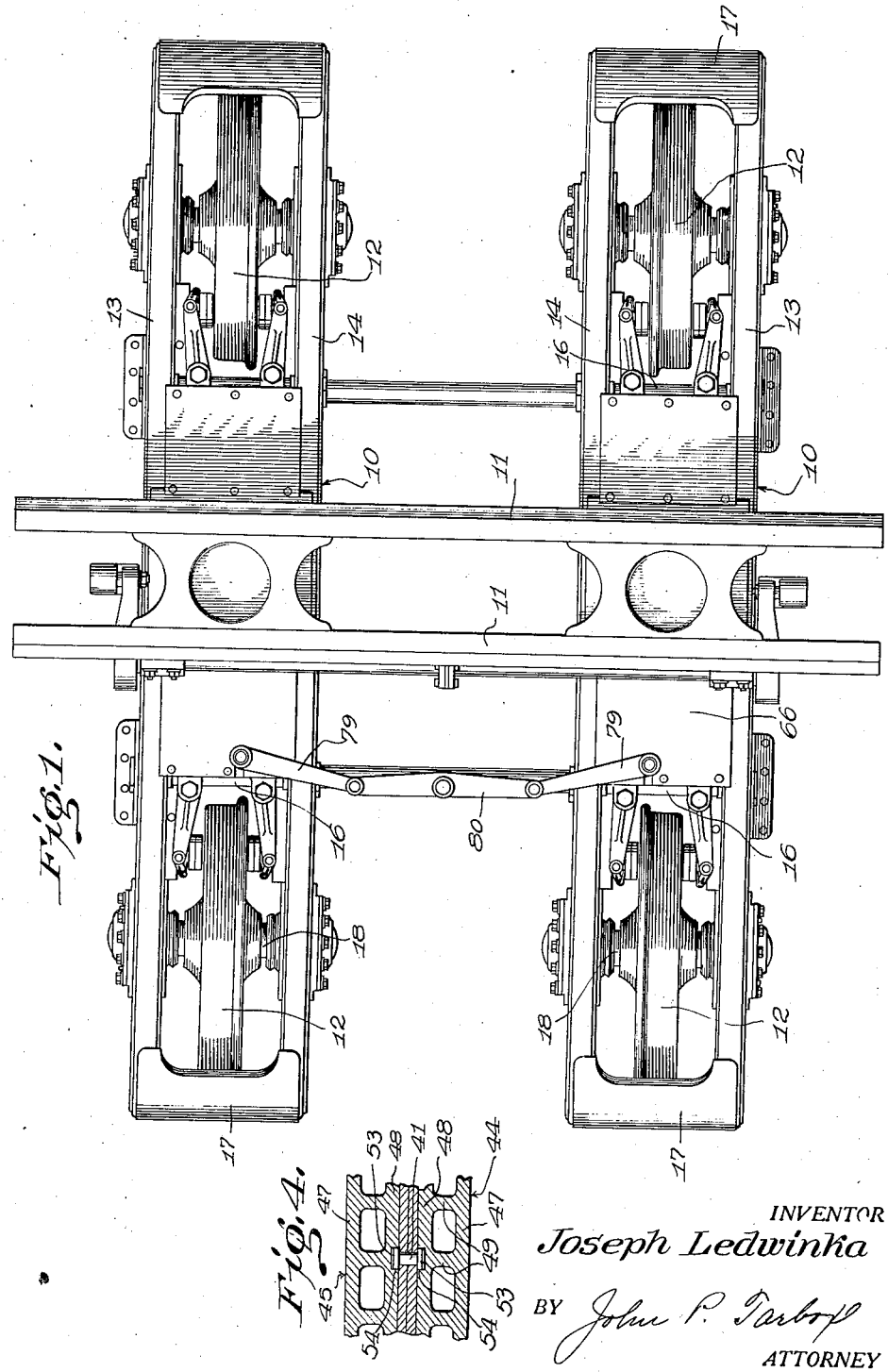
Fig. 1 is a plan view of a truck showing the brake mechanism of the invention applied thereto.

The brake mechanism of the invention is shown applied to a truck structure of the type shown in my co-pending application, Serial No. 417,991, filed November 6, 1941, in which the two trucks, as 10, are individually pivotally connected to the car body represented by the bolster sills 11 intermediate their ends and carry, adjacent their ends the independently rotatably mounted wheels, as 12. Since the brake mechanism associated with the respective wheels is substantially the same for each, only one such mechanism is illustrated in detail in the drawings and the description will be mainly limited thereto.

As shown, each truck 10 comprises a spaced pair of longitudinally extending vertically deep, transversely narrow girders or frame members designated 13 and 14 which are interconnected by transverse members 15, 16 and 17. Each wheel 12 is mounted on an axle 18 running in suitable bearings in the girders, to rotate in the space between the girders and the intermediate transverse member 16 is arranged close to the inner side of the wheel and serves, in addition to a strong interconnection between the girders, as a brake support. This intermediate member 16 may be and preferably is a casting vertically of substantially the depth of the girders and is readily removably secured thereto to permit assembly thereof and the brake mechanism carried thereby as a unit with the frame.

Figure 2:
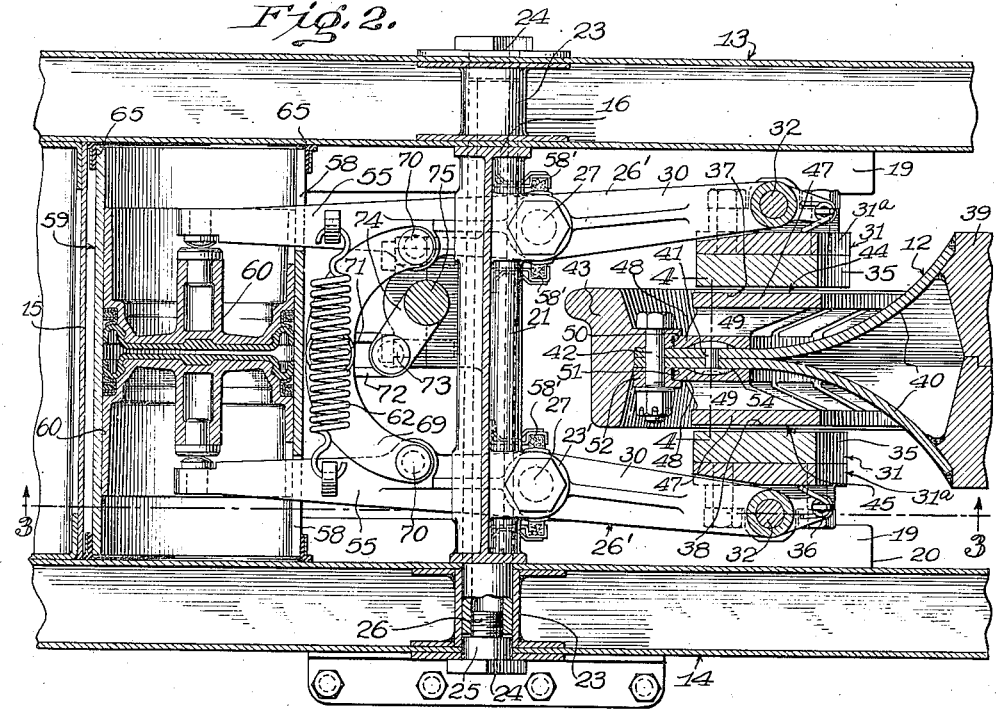
Fig. 2 is an enlarged sectional plan view through the brake mechanism and related truck parts, the section being taken substantially on the line 2—2 of Fig. 3.
Figure 3:
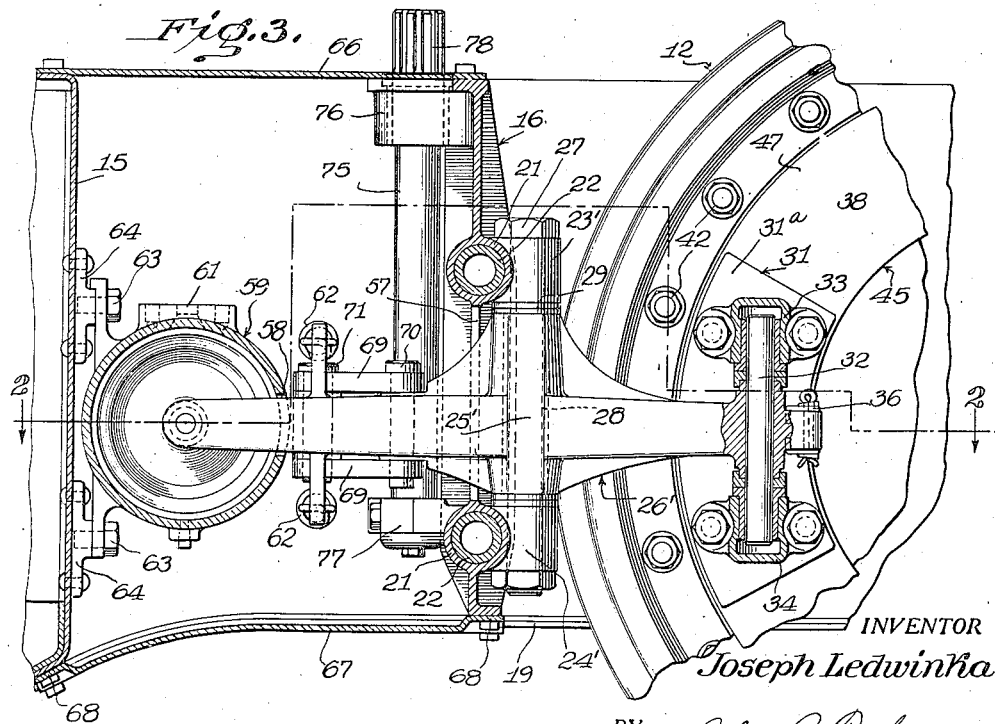
Fig. 3 is a vertical longitudinal sectional view taken substantially along the line 3—3 of Fig. 2

As shown in Figs. 2 and 3, the member 16 rests on the inwardly extending flanges 19 from the girders, which flanges extend through the central portion of the girders to a terminus 20 in the region of a wheel 12. Two vertically spaced transverse sleeves 21 are formed in the member 16 these sleeves each being adapted to receive a tubular member 22 extending through the sleeve 21 and part way through the reinforced openings 23 in the girders.

To clamp the member 16 between the side girders, the ends of the tubular members 22 are formed with an internal screw thread, and clamping bolts 24 each having an enlarged part 25 fitting the opening in the girder and a reduced screw-threaded part 26 engaging the screw-threads on the adjacent end of the member 22 are provided to draw the girders tightly against the member 16, as shown in Fig. 2. If desired, an end of the tubular member 22 may be formed with an integral head, the clamping bolt, as 24, being provided only at one end of the tubular connecting member 22.

As shown in Figs. 1 and 3, the interconnecting brake support 16 is located close to the periphery of the adjacent wheel and projecting toward the wheel are the vertically spaced bearing sleeves 23' and 24', there being two laterally spaced pairs of such sleeves, each pair adapted to receive between them the elongated hub 25' of a brake lever, as 26', the brake lever being pivotally secured to the vertically spaced sleeves, by a pivot bolt 27 extending through the bearing sleeves and the hub of the lever. The hub of the lever may be supplied with a suitable bearing lining, as 28, and similar bearing washers 29 may be interposed at top and bottom between the lever hub and the bearing sleeves.

The outer arms, as 30, of the brake levers, each carry a segmental brake shoe 31 pivotally mounted thereon by a mounting pin 32 passing vertically through the enlarged end of the arm and having its ends rotatable in top and bottom bearing caps 33 and 34 bolted to the shoe backing plate 31a. A suitable friction material, as a composition lining 35, is secured to the backing plate to form the working face of the shoe. A spring 36 may be provided to maintain the shoe substantially parallel to the cooperating braking face on the wheel when the brakes are in the released position, as shown.

The wheel 12 is mounted to have its outer periphery rotate between the opposed brake shoes and the annular braking faces 37 and 38 carried by the opposite sides of the wheel are in a position to be engaged, respectively, by the opposed shoes. The wheels are shown constituted of a hub 39 to which are secured, as by welding, at widely axially spaced locations, the two dished discs 40 constituting the body of the wheel. At their outer periphery the discs lie face to face and are secured together as by an annular series of rivets, as 41, and also an annular series of bolts, as 42, securing the radially inwardly extending flange of the rim 43 seated on the periphery of the wheel body, to the wheel body. The annular brake rings 44 and 45 are secured to the opposite faces of the wheel body to rotate therewith as hereinafter described.

To provide adequate cooling, each ring comprises a cast member having a continuous outer annular ring 47 forming the braking face, as 37 or 38, and an inner attaching ring 48, the latter being of larger external and internal diameter than the former, the two rings being interconnected by radial vanes or braces 49 forming with the rings passages for the cooling air, which is sucked into these passages at their inner open ends and discharged centrifugally through their outer ends.

The brake rings are loosely or floatingly held to the opposite sides of the wheel to allow for their radial expansion and contraction under the varying conditions of temperature by having the outer periphery of the inner attaching rings 48 received, respectively, in an annular recess 50 in the rim flange and a corresponding recess 51 in a clamping ring 52 for clamping the wheel body to the rim flange by the tightening of the securing bolts 42. As shown in Fig. 2, these recesses are of a depth to allow radial expansion of the brake rings under the heat of braking. The axial depth of these recesses is such as to hold the attaching rings with but a light clamping pressure not substantially interfering with this desired freedom to expand and yet preventing looseness of the parts and resultant rattling. To lock the brake rings to rotate with the wheel and yet allow the radial expansion, the rivets 41, see Figs. 2 and 4, are provided with radially elongated heads 53 on opposite sides of the wheel which are extended into shallow radial grooves 54 in the inner faces of the attaching rings. As shown, both the bottoms of the grooves and the outer faces of the heads may be of a slight and corresponding curvature. This arrangement avoids the grooves being extended to the inner periphery of the ring where the dirt would enter them.

The other arms 55 of the brake levers 26 pass through openings, as 57, in the web of the member 16 and through slots 58 in a brake cylinder 59 where these ends are in a position to be engaged, respectively, by the pistons 60, between which air or other fluid is admitted through port 61 for actuating the levers in the normal braking. The levers are held in retracted position by tension springs 62 interconnecting them. The cylinder is conveniently carried by the transverse member 15, near the center of the truck. In the present case, it is shown bolted at 63 to brackets 64 which are in turn riveted to the member 15. The ends of the cylinder extend close to but out of engagement with the inner faces of the girders 13 and 14. If desired, the space may be closed by annular rubber gaskets 65 secured to the ends of the cylinder.

By reference to Fig. 2 and Fig. 3, it will be seen that most of the brake mechanism is arranged vertically between the top and bottom of the girders 13 and 14 so that the transverse members 15 and 16 together with the inner faces of members 13 and 14 form a vertically deep rectangular box, which, if closed at top and bottom, seals the brake mechanism in a closed chamber. To effect this seal, the top of the box may be closed by a removable plate 66 secured to the tops of the girders 13 and 14 and the top of the transverse members 15 and 16 and the bottom may be closed by a similar plate 67 upwardly offset, as at 68, between the flanges 19, and secured to the bottoms of these members. The openings 57 in the member 16 may be sealed, as indicated in Fig. 2, by a flexible sealing means 58' closing the opposite sides of the openings from the upper to the lower sleeves 21 in member 16. Thus it will be seen that the brake mechanism is sealed for the most part from dust and dirt, snow and ice.

The brake support 16 may also serve to carry the emergency actuating means which is shown to comprise upper and lower pairs of toggle links 69 connected to the brake levers by pivot pins 70 and to each other by pivot pin 71, between the toggles the pin 71 is engaged by a link 72 which also surrounds a pin 73 on a crank arm 74 secured to the vertical actuator shaft 75. The latter is mounted in vertically spaced bearings 76 and 77 projecting from the inner face of the member 16 and has a splined end 78 projecting above the top closing plate 66. To this splined end of the shaft 75 may be secured an arm 79 and the corresponding arm from the adjacent wheel of the opposite truck may be secured to it by an equalizer bar 80, which may be centrally connected to an actuating rod or cable, not shown. The lost motion connection afforded by the link 72 permits normal actuation by the cylinder without operating the emergency operating shaft 75.

From the foregoing description, it will be clear that when the brake operating fluid, such as air is introduced through the ports of the cylinders, the pistons are forced apart thus rocking the brake levers, and causing the shoes to be forced into braking engagement with the radial faces on the rings at the opposite sides of the wheels, and since all the wheels of the truck structure are provided with similar brake mechanism all will be correspondingly braked. Upon release of the fluid pressure from the cylinders the springs, as 62, interconnecting the brake levers 26 will return the shoes to the inoperative position shown in Fig. 2.

It will be seen that the brake mechanism associated with a given wheel may be readily assembled and disassembled. For example, all the parts carried by the transverse member 16 may be assembled or disassembled as a unit therewith. In the disassembly, by first removing the top cover plate, then releasing and withdrawing the clamping tubes 22 and then tilting the member to clear the wheel, withdrawing the brake levers through the slots in the cylinder and the entire subassembly unit can be removed upwardly from between the spaced girders 13 and 14. The assembly of the parts will be carried out by reversing the procedure.

Though only a single form of the invention is illustrated and described, the invention is not limited thereto but may be embodied in various forms as desired. As various changes in construction and arrangement of the parts may be made without departing from the spirit of the invention as will be apparent to those skilled in the art, reference will be had to the appended claims for a definition of the limits of the invention.

What I claim is:

1. In a brake mechanism for wheels mounted for rotation between vertically deep longitudinal truck frames, comprising radial braking faces on opposite sides of the wheel rotating therewith, a transverse brake support interconnecting the frames adjacent the wheel, brake shoes supported in cooperative relation with the radial braking faces on the opposite sides of the wheel, actuating levers mounted in said support and carrying the shoes and a brake cylinder independent of said support mounted on the truck on the side of said support remote from the wheel, said cylinder having pistons therein for actuating the respective levers to apply the brakes.

2. In a wheeled truck having vertically deep longitudinally extending members spaced apart to rotatably mount the wheels between them, a brake support removably secured between said members adjacent a wheel, brake mechanism comprising actuating levers carried by said support and shoes carried by said levers and assembled or disassembled as a unit with said removably mounted support.

3. In a brake mechanism for trucks having vertically deep spaced and centrally interconnected members rotatably mounting the wheels between them and having a space between a wheel mounting and the interconnected central portion of said spaced members, a brake mechanism received in said space including a brake support vertically of the depth of said members interconnecting them just inside a wheel, actuating levers mounted in said support and carrying at the ends adjacent the wheels brake shoes for cooperation with braking faces rotatable with the wheels to effect the braking, and having their opposite ends extended on the opposite sides of said support, a brake cylinder for actuating said levers, and means for closing the space between the spaced members, the brake support and the central connection between said members both at top and bottom to form an enclosure for the major part of the brake mechanism.

4. In a brake mechanism for trucks having vertically deep spaced members rotatably mounting the wheels between them, a wheel carrying on the opposite sides thereof radial braking faces, brake shoes for cooperation with said faces, means for supporting the shoes comprising a vertically deep transverse member extending between and interconnecting the sides faces of said spaced members, brake shoe-actuating levers pivoted on said transverse member and carrying said shoes at one of their ends and a brake cylinder carried by the truck frame and connected with the opposite ends of said levers to actuate the shoes into braking engagement.

5. In a brake mechanism for wheels mounted for rotation between longitudinal vertically deep truck frame members, a vertically deep transverse brake supporting member interconnecting the longitudinal frame members adjacent a wheel, longitudinally extending brake levers at the opposite sides of the wheel carrying brake shoes for cooperation with braking faces on the opposite sides of the wheel, vertically spaced bearings on said supporting member for each of said levers, each of the levers having an elongated hub extending between the bearings, and a pivot pin passing through said bearings and hub.

6. In a brake mechanism for wheels mounted for rotation between longitudinal vertically deep truck frame members, a unitary brake subassembly for assembly as a unit with said frame members to form an interconnection therebetween adjacent a wheel, said subassembly comprising a vertically deep transverse member, brake levers extending longitudinally through openings therein and mounted on vertical pivots carried by said member, and brake shoes carried by one of the ends of said levers, the opposite ends being adapted to cooperate with the pistons of a brake cylinder when assembled but being readily withdrawn from their cooperative relation with the pistons when the unit is disassembled from the frame members.

7. In a brake mechanism for a wheel mounted for rotation between vertically deep longitudinally extending frame members, the wheel being provided with braking faces on its opposite sides, a vertically deep transverse brake supporting member transversely interconnecting said frame members adjacent the wheel, longitudinally extending brake levers carrying brake shoes in cooperative relation to said braking faces, respectively, and pivoted on said support, a brake cylinder for actuating said shoes, a vertical shaft mounted in said support and connections between said shaft and the brake levers for emergency operation of the brakes.

8. In a brake mechanism for a wheel mounted for rotation between vertically deep longitudinally extending frame members interconnected by similarly vertically deep transverse members, one adjacent the wheel and another spaced from the first member and remote from the wheel, longitudinally extending brake levers mounted in said transverse member adjacent the wheel and carrying brake shoes in cooperative relation with braking faces on the opposite sides of the wheel, said levers extending through openings in the transverse member mounting them, brake cylinder and emergency operating means associated with said levers in the space between the two transverse members and means for closing the space between the longitudinal frame members and the spaced transverse members to form a housing for the brake mechanism therein.

9. In a brake mechanism for a wheel mounted for rotation between vertically deep longitudinally extending frame members, a similar vertically deep transverse brake support removably connecting said longitudinal members adjacent a wheel, said brake support having openings therein through which longitudinally extending brake levers mounted on one face thereof extend, an emergency brake operating shaft mounted on the other face of said transverse member, said removable securing means for said transverse brake support disposed between the brake lever and emergency brake operating mountings.

10. In a brake mechanism for a wheel mounted for rotation between longitudinally extending frame members, said frame members interconnected by spaced transverse members, one a brake supporting member adjacent a wheel and another remote from the wheel, the wheel carrying braking faces on its opposite sides, longitudinally extending brake levers extending through said brake supporting member and mounted through vertical pivots thereon intermediate their ends, the ends of the levers adjacent the wheels carrying brake shoes for cooperation with the braking faces on the wheels, a brake cylinder mounted on the transverse member remote from the wheel and having pistons therein movable outwardly to operate the brakes, the ends of the levers remote from the wheel extending into cooperative relation to the outer faces of the pistons, respectively, and means for returning the levers and brake shoes to inoperative position after actuation by the pistons to the braking position.

JOSEPH LEDWINKA.